May 2, 1939.  G. V. LACHMANN  2,156,994
AIRCRAFT
Filed June 13, 1938   4 Sheets-Sheet 1

Gustav Victor Lachmann
Inventor
By

May 2, 1939.  G. V. LACHMANN  2,156,994
AIRCRAFT
Filed June 13, 1938   4 Sheets-Sheet 2
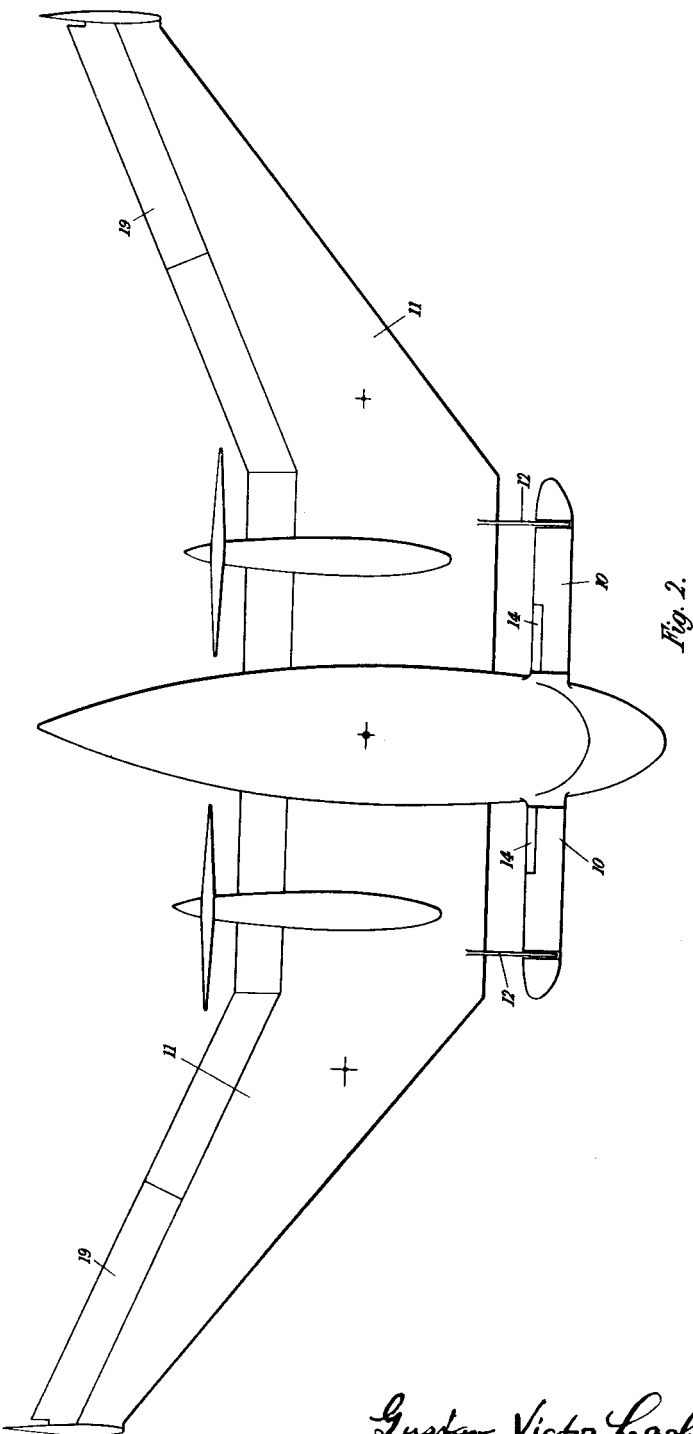

May 2, 1939.    G. V. LACHMANN    2,156,994
AIRCRAFT
Filed June 13, 1938    4 Sheets-Sheet 4

Gustav Victor Lachmann
Inventor
By

Patented May 2, 1939

2,156,994

UNITED STATES PATENT OFFICE 2,156,994

AIRCRAFT

Gustav Victor Lachmann, Canons Park, England, assignor to Handley Page Limited, Cricklewood, Middlesex, England Application June 13, 1938, Serial No. 213,510
In Great Britain July 2, 1937

10 Claims. (Cl. 244—75)

The present invention has for its purpose to facilitate longitudinal trim and control of tailless aircraft.

In tailless aircraft longitudinal stability of the main wing is obtained by arranging the centre of gravity somewhat in front of the mean aerodynamic centre (M. A. C.), which is defined as that point on the wing where the lift is concentrated at all angles of attack. The noseheavy constant pitching moment due to the lift acting at a distance behind the centre of gravity (C. G.) has to be balanced by a constant tailheavy moment of equal magnitude in order to trim the air craft at a certain flying speed. Known means to produce constant tailheavy moments (i. e. moments invariant of angle of incidence) consist in using either wing sections or shaped centre line or pulling up trailing edge flaps. The disadvantage of these methods is that the production of tailheavy pitching moments is bound up with a reduction of the maximum lift of the wing of the tailless machine compared with that of an ordinary monoplane fitted with a stabilising tail. Besides, the fact that flaps can only produce a relatively small tailheavy pitching moment if too serious a loss of maximum lift is to be avoided, limits the distance of the C. G. in front of the M. A. C. and hence limits the degree of static longitudinal stability. Conditions become even more unfavourable if lift flaps are fitted to the rear portion of the wings. It is well-known that such flaps produce very strong noseheavy pitching moments. If they are arranged further forward on the chord their maximum lift is substantially reduced.

The aerodynamic principle of this invention is to obtain constant or nearly constant positive (i. e. tailheavy) pitching moment coefficients (invariant of the angle of incidence) without causing a loss of maximum lift.

In its broadest aspect the invention consists in a device for obtaining longitudinal equilibrium in tailless aircraft of the kind having a longitudinally stable main wing. This device is a small auxiliary aerofoil located in front of the centre of gravity of the aircraft and preferably in front of the leading edge of the main wing. The auxiliary aerofoil is freely pivoted at a point in front of its mean aerodynamic centre, with the result that it will preserve a substantially constant angle of incidence to the airflow notwithstanding changes in the angle of incidence of the main wing. The pitching moment coefficient due to the auxiliary aerofoil, is therefore, substantially constant whatever the angle of incidence of the main wing.

The auxiliary aerofoil is provided with a trimmer tab, which is adjustable by the pilot to vary the angle of incidence to the airflow which the auxiliary aerofoil will adopt, and hence the magnitude of the pitching moment coefficient which can be obtained.

The idea of arranging an auxiliary aerofoil in front of the main wing is not broadly new. Aeroplanes with fixed auxiliary aerofoils arranged in front of the main wing have been built and flown. However, in these known aeroplanes the auxiliary aerofoil was fixed rigidly to the main wing structure and although a movable flap was attached which acted as elevator, the auxiliary aerofoil considered as a whole (with elevator fixed) produces an increasingly tailheavy moment as the incidence increases.

It is likewise known to arrange an auxiliary aerofoil in front of the leading edge of the main wing so that it can assume certain attitudes within fixed limits but the auxiliary aerofoil according to this proposal was neither freely pivoted at a point in front of its mean aerodynamic centre so as to give a constant lift coefficient nor could it be controlled during flight in such a way as to vary the magnitude of this constant lift coefficient. The auxiliary aerofoil is so pivoted that when flying at a relative low angle of incidence of the main wing, the auxiliary aerofoil takes up a position in which it offers minimum drag. When the angle of incidence approaches the stalling angle, however, the auxiliary aerofoil moves automatically under the influence of the airflow so that its trailing edge rises and enables the air to flow through a slot between it and the leading edge of the main wing, thereby delaying the breakdown in the airflow over the upper surface of the main wing.

Two constructions of tailless aircraft according to the invention will now be described in further detail, by way of example, with reference to the accompanying drawings, in which—

Figure 2 is the corresponding plan view;

Like references indicate like parts throughout the drawings.

Figure 1:
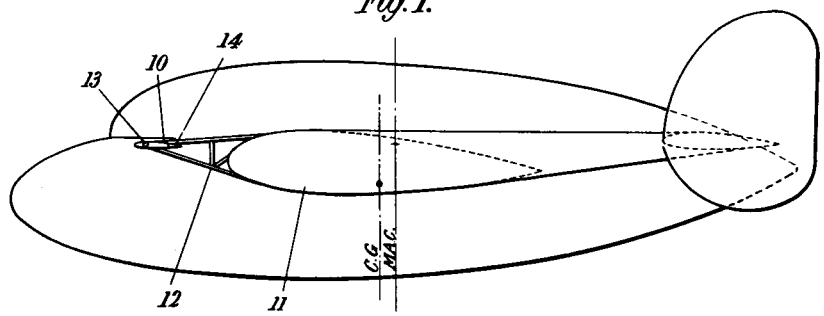
Figure 1 is a side elevation of the aircraft constituting the first embodiment.
Figure 3:
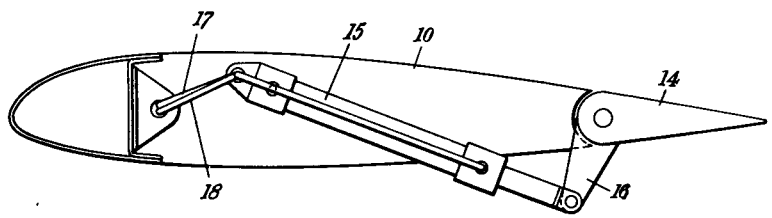
Figure 3 is a detail view of a mechanism for adjusting the trimmer tab.

Referring first of all to Figures 1–3 of the drawings, a small auxiliary aerofoil 10 is arranged somewhat in front and slightly above the leading edge of the main wing 11. It is carried by outriggers 12 and pivoted about an axis 13 which lies in front of the M. A. C. of the auxiliary plane. It is mass balanced by weighting its nose portion so that it can freely float. This auxiliary aerofoil 10 has a trimmer tab 14 fitted to its trailing edge which permits of trimming the auxiliary aerofoil 10 to a predetermined constant angle relatively to the surrounding airflow. It has been proved by wind tunnel tests that with such an arrangement the lift coefficien of the auxiliary aerofoil can be kept practically constant within the practical range of angles of incidence of the main wing for ordinary flight. Hence a constant positive pitching moment coefficient, invariant of angle of incidence, can be obtained. The magnitude of this pitching moment coefficient can be altered by suitable setting of the trimmer tab. This trimmer tab can be actuated by the pilot by means of a mechanical device passing through the axis about which the auxiliary aerofoil is pivoted, or by hydraulic means. A hydraulic mechanism is indicated in Figure 3. It consists of a jack 15 coupled to the trimmer tab by a lever 16. Pipes 17, 18 passing through the centre of the pivot communicate with the jack and serve for the passage of the actuating pressure fluid. With either mechanically or hydraulically controlled trimmer tabs provision is made that the setting of the trimmer tab relatively to the auxiliary aerofoil is fixed for any given setting of the pilot's actuating control and is independent of the angular setting of the auxiliary aerofoil relatively to the main wing. The main wing of the aircraft is provided with trailing edge flaps 19 which can be moved in opposite directions to give aileron control and in the same direction to give elevator control.

If the main wing is fitted with lift flaps, the flap actuating gear and the trimmer tab fitted to the auxiliary aerofoil may be interconnected in such a way that lowering the flaps automatically actuates the trimmer tab to cause the auxiliary aerofoil to set itself at such an angle that the change in lift produced on the auxiliary aerofoil provides a pitching moment which balances the pitching moment due to lowering the lift flaps.

The change of trim due to the noseheavy moment which occurs when the flaps are lowered can be reduced within limits by sweeping the wings back; however, the degree of angle of sweep back is limited by various considerations, a very large angle of sweepback being undesirable and impracticable. For a given degree of sweepback the size and efficiency of the flap which when lowered will not cause a too serious change of trim are therefore limited. On wings having only a small angle of sweepback, only flaps of very poor efficiency, i. e. of small lift increasing capacity can be applied. The addition of the floating aerofoil to such wings permits of using flaps of greater efficiency.

Figure 5:
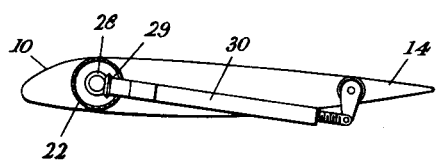
Figure 5 is a section taken on the line V—V in Figure 4.
Figure 4:
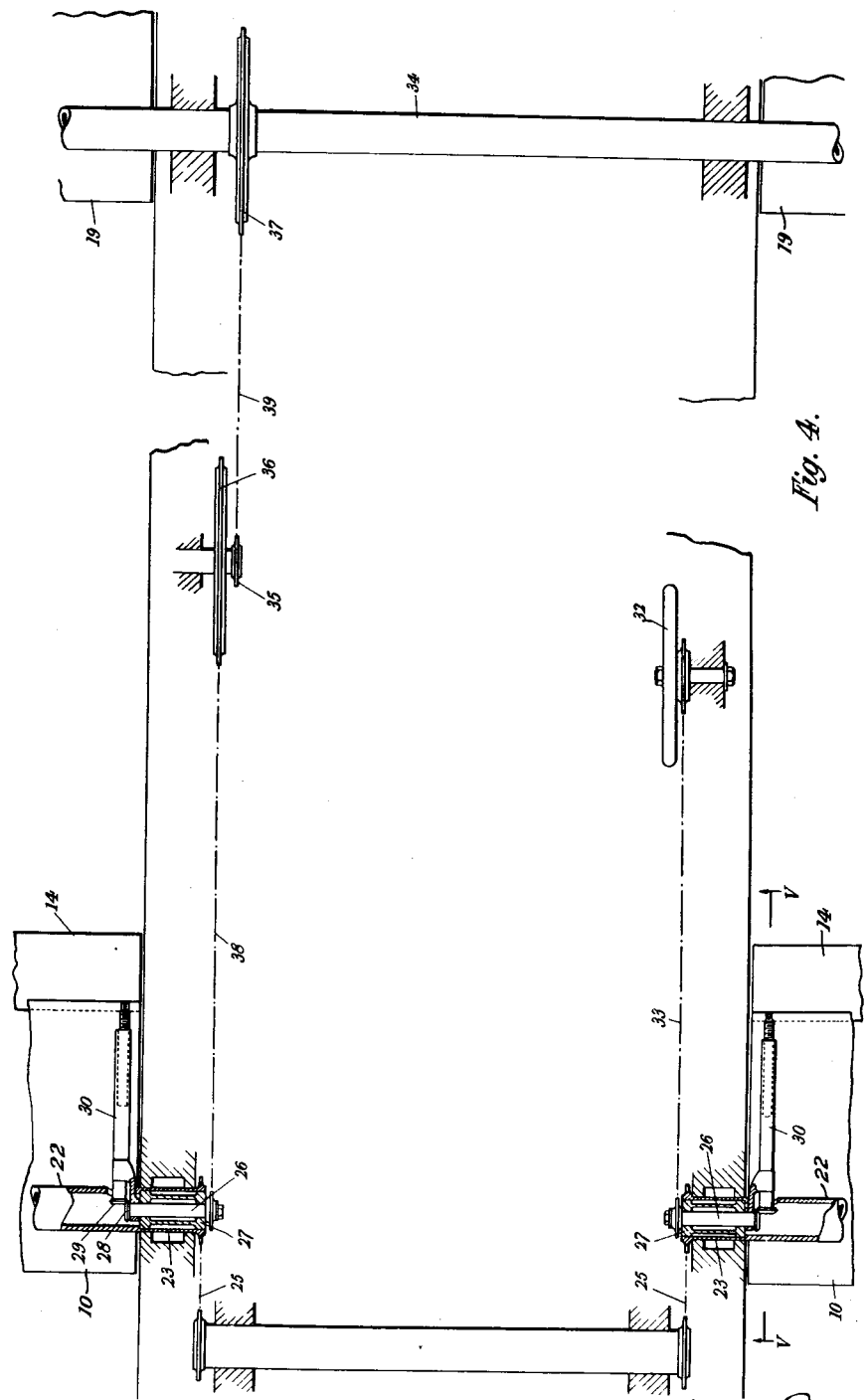
Figure 4 is a plan view, partly in section, of the second embodiment showing the mechanism for adjusting the trimmer tab.

A second embodiment of the invention, in which the trimmer tabs are adjustable both directly by a pilot's control and automatically in connection with the flap operation is illustrated in Figures 4 and 5. The floating auxiliary aerofoil 10 is mounted on a tubular axis 22 which is supported at the sides of the fuselage in bearings 23. The axis 22 is not continuous through the fuselage but simultaneous action of both sides of the auxiliary aerofoil is secured by means of the torque tube 24 and the chain and sprocket transmissions 25. The auxiliary aerofoil 10 has a trimmer tab 14, the starboard and port portions of which are separately adjustable as hereinafter described.

Mounted inside the two portions of the tubular axis 22 are shafts 26 held in bearings 27. These shafts are interconnected through bevels 28 and 29 with self-locking screw jacks 30 which are arranged inside the auxiliary aerofoil. The free end of each screw jack is connected with the trimmer tab 14. The trimmer tab on the port side of the aircraft can be adjusted by the pilot by means of the hand wheel 32 and the chain and sprocket transmission 33. The flaps 19 at the trailing edge of the main wing are carried on a flap torque tube 34. The portion of the trimmer tab 14 on the starboard side of the fuselage is directly interconnected with the flap torque tube 34 through chains 38 and 39, whereby the angular rotation of the flap torque tube is sufficiently geared up by means of sprockets 35, 36 and 37. The action of the system is as follows:—

If the flaps 19 are lowered (thereby causing a noseheavy pitching moment of the whole aircraft), the starboard shaft 26 will be rotated in a clockwise sense (seen from the interior of the fuselage). This rotation will be imparted to the outer housing of the screw jack 30 causing the jack to extend and thus adjust the starboard portion of the trimmer tab at an upward angle. This setting of the trimmer tab will cause the floating aerofoil to adjust itself at a greater angle relatively to the airflow. It will thus produce a greater lift coefficient and hence a moment which, if the design is properly laid out, should be equivalent in magnitude but opposite in direction to the noseheavy moment produced by the flaps.

Whilst the adjustment of the starboard portion of the trimmer tab is automatic and solely dependent on the setting of the flaps the adjustment of the port portion of the trimmer tab is entirely controlled by the pilot. For example, if the pilot wants to trim the aircraft at a larger angle of incidence, or if changes of the C. G. position should induce him to do so, he will rotate the hand wheel 32 in an anticlockwise direction (see from the exterior of the fuselage). In doing so he will also cause an upward adjustment of the portion of the trimmer tab on the port side causing the floating aerofoil to set itself at a larger angle and thus produce a moment which tries to lift up the nose of the aircraft. The screw jack may be replaced by hydraulic means.

The splitting of the trimmer tab into two independently operable portions, namely a starboard portion controlled by the flaps and a port portion controlled by the pilot thus enables the desired twofold control to be obtained. It will be understood, however, that the auxiliary aerofoil as a whole will, owing to the interconnection of its starboard and port portions through the torque tube 24, respond to a change in setting of either portion of the trimmer tab.

Although in the example just described the trimmer tab is split into two independently operable portions, it may in some cases be more convenient to subdivide it into a larger number of independently operable portions.

Figure 6:
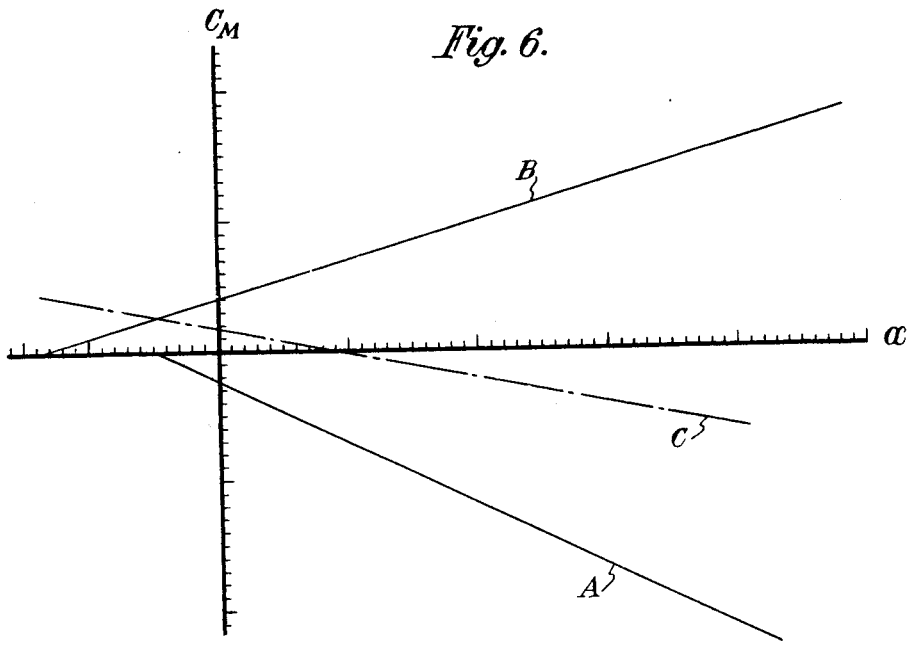
Figure 6 is a pitching moment diagram with pitching moments plotted as ordinates and tail-heavy pitching moments being represented as positive and with angles of incidence as abscissae, for an aircraft of the known type in which there is a fixed auxiliary airfoil in front of the main wing.
Figure 7:
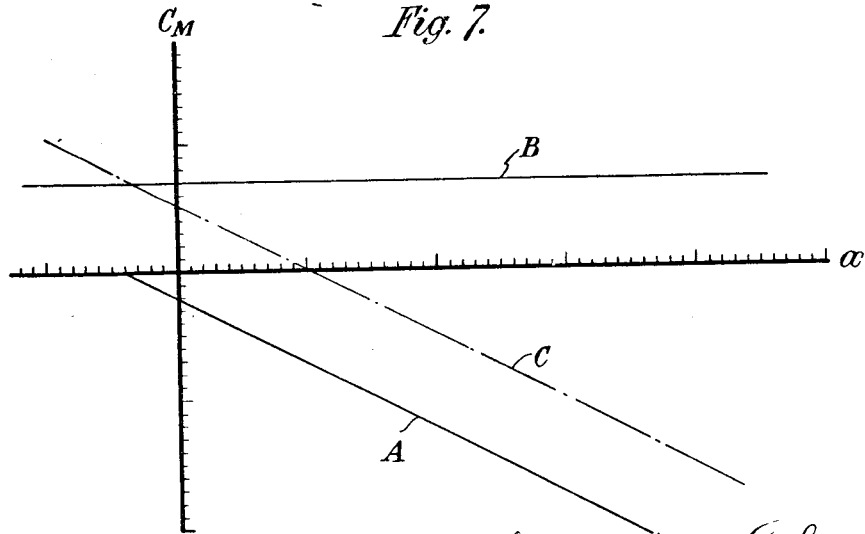
Figure 7 is a similar diagram for an aircraft according to the invention.

The difference between the known type of aircraft with a fixed front auxiliary aerofoil and the type of aircraft according to the invention becomes evident by comparing the pitching moment diagrams shown in Figures 6 and 7.

The diagram in Figure 6 shows pitching moments for typical wing with fixed forwardly located auxiliary aerofoil. The pitching moment about the C. G., due to the main wing and represented by the line A is stable, whilst the pitching moment due to the fixed front auxiliary aerofoil represented by the line B is unstable. The resulting moment curve C is stable but its slope and consequently its stability are of course reduced compared with those of the main wing alone.

Figure 7 illustrates the conditions for an aircraft with a floating front auxiliary aerofoil according to the invention. In this case the moment coefficient $Cm$ due to the floating auxiliary aerofoil is constant and the moment curve B is a straight line parallel to the $\alpha$ axis.

The pitching moment due to the wing is stable and represented by the line A and the resulting moment curve C is a straight line parallel to the wing moment curve. Hence the degree of stability is the same as for the wing alone. As will be seen, the effect of the auxiliary aerofoil is to cause the aircraft to trim at a positive angle of incidence $\alpha_1$, instead of at a negative angle $\alpha_2$ as it would without the auxiliary aerofoil. By adjusting the trimmer tab and therefore varying the value of $Cm$ due to the auxiliary aerofoil equilibrium can be obtained over a range of positive angles of incidence, i. e. the value of the angle $\alpha_1$ at which the aircraft will trim can be varied.

What I claim as my invention and desire to secure by Letters Patent is:

1. In a tailless aircraft, the combination with a longitudinally stable main wing of an auxiliary aerofoil located in front of said wing and pivoted at a point in front of its means aerodynamic centre so as to be freely movable relatively to the main wing under the influence of the airflow about an axis extending parallel to its span, a trimmer tab attached to the auxiliary aerofoil, and means operable by the pilot of the aircraft for adjusting the setting of the trimmer tab relatively to the auxiliary aerofoil.

2. In a tailless aircraft, the combination with a longitudinally stable main wing of an auxiliary aerofoil located in front of said wing and pivoted at a point in front of its mean aerodynamic centre so as to be freely movable relatively to the main wing under the influence of the airflow about an axis extending parallel to its span, a trimmer tab attached to the auxiliary aerofoil, and a hydraulic jack, interposed between the auxiliary aerofoil and the trimmer tab, and means for operating the jack to adjust the setting of the trimmer tab relatively to the auxiliary aerofoil.

3. In a tailless aircraft, the combination with a longitudinally stable main wing of an auxiliary aerofoil located in front of said wing and pivoted at a point in front of its mean aerodynamic centre so as to be freely movable relatively to the main wing under the influence of the airflow about an axis extending parallel to its span, a trimmer tab attached to the auxiliary aerofoil, and a screw jack, interposed between the auxiliary aerofoil and the trimmer tab, and means for operating the jack to adjust the setting of the trimmer tab relatively to the auxiliary aerofoil.

4. In a tailless aircraft, the combination of a longitudinally stable main wing, lift flaps attached to said main wing, an auxiliary aerofoil located in front of the main wing and freely pivoted for movement relatively thereto under the influence of the airflow about an axis extending in the direction of its span, the point of pivoting of the auxiliary aerofoil being disposed in front of its mean aerodynamic centre, a trimmer tab fitted to the auxiliary aerofoil, and a connection between the lift flaps and the trimmer tab such that depression of the lift flaps actuates the trimmer tab to increase the angle of incidence of the auxiliary aerofoil.

5. In a tailless aircraft, the combination of a longitudinally stable main wing, lift flaps attached to said main wing, an auxiliary aerofoil located in front of the main wing and freely pivoted for movement relatively thereto under the influence of the airflow about an axis extending in the direction of its span, the point of pivoting of the auxiliary aerofoil being disposed in front of its mean aerodynamic centre, a trimmer tab fitted to the auxiliary aerofoil and divided into two portions, a connection between one of the lift flaps and one portion of the trimmer tab such that depression of the lift flaps actuates the trimmer tab to increase the angle of incidence of the auxiliary aerofoil, and a pilot's control which is adjustable to alter the setting of the other portion of the trimmer tab independently of the lift flaps.

6. A tailless aircraft having a longitudinally stable fuselage, a main wing, lift flaps fitted to said main wing, a pair of outriggers extending forwardly from the main wing one on each side of the fuselage, an auxiliary aerofoil divided into two portions, each disposed between the fuselage and of one of the outriggers, the auxiliary aerofoil being freely pivoted at a point in front of its mean aerodynamic centre for movement relatively to the main wing under the influence of the airflow about an axis extending in the direction of its span, a torque tube interconnecting the two portions of the auxiliary aerofoil, a trimmer tab fitted to each portion of the auxiliary aerofoil, a connection between one lift flap and one of the trimmer tabs such that on depression of the lift flap the trimmer tab is adjusted to increase the angle of incidence of the auxiliary aerofoil, and a pilot's control for adjusting the setting relatively to the auxiliary aerofoil of the other trimmer tab independently of the movement of the lift flap.

7. An aircraft as claimed in claim 6, having a hollow span-wise tube supporting each portion of the auxiliary aerofoil and serving as the pilot therefor, said tubes being geared together through the intermediary of the torque tube, a screw jack interposed between each trimmer tab and the auxiliary aerofoil, and a jack-actuating spindle rotatably mounted within each hollow tube, one of said spindles being rotatable under the action of one of the lift flaps and the other spindle being rotatable under the action of the pilot's control.

8. In a tailless aircraft, the combination with a longitudinally stable main wing of a fore and aft trimming device constituted by a floating auxiliary aerofoil located in front of the centre of gravity of the aircraft, said auxiliary aerofoil being freely pivoted about a spanwise axis in front of its mean aerodynamic centre, and having a trimmer tab which is adjustable by the pilot to vary the angle of incidence at which said auxiliary aerofoil will float relatively to the airflow and therefore the trim of the aircraft.

9. In a tailless aircraft, the combination with a longitudinally stable main wing of a fore and aft trimming device constituted by a floating auxiliary aerofoil located in front of the centre of gravity of the aircraft, said auxiliary aerofoil being so mounted as to enable it to float freely and preserve a substantially constant angle of incidence to the airflow notwithstanding changes in the angle of incidence of the main wing, and having a trimmer tab which is adjustable by the pilot to vary the angle of incidence at which said auxiliary aerofoil will float relatively to the airflow and therefore the trim of the aircraft.

10. In a tailless aircraft, the combination with a longitudinally stable main wing of a fore and aft trimming device constituted by a floating auxiliary aerofoil located in front of the centre of gravity of the aircraft, said auxiliary aerofoil being so mounted as to enable it to float freely and preserve a substantially constant angle of incidence to the airflow notwithstanding changes in the angle of incidence of the main wing, and means operable by the pilot to adjust the angle at which the auxiliary aerofoil will float and therefore the trim of the aircraft.

GUSTAV VICTOR LACHMANN.